(12) United States Patent
Kasahara

(10) Patent No.: US 9,880,713 B2
(45) Date of Patent: Jan. 30, 2018

(54) DISPLAY CONTROL APPARATUS, DISPLAY CONTROL METHOD, AND PROGRAM

(71) Applicant: SONY CORPORATION, Tokyo (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 314 days.

(21) Appl. No.: 14/343,987

(22) PCT Filed: Oct. 4, 2012

(86) PCT No.: PCT/JP2012/006382
§ 371 (c)(1),
(2) Date: Mar. 10, 2014

(87) PCT Pub. No.: WO2013/073100
PCT Pub. Date: May 23, 2013

(65) Prior Publication Data
US 2014/0223323 A1 Aug. 7, 2014

(30) Foreign Application Priority Data
Nov. 16, 2011 (JP) .................................. 2011-250955

(51) Int. Cl.
*G06F 3/0484* (2013.01)
*G06F 1/16* (2006.01)
(Continued)

(52) U.S. Cl.
CPC .......... *G06F 3/0484* (2013.01); *G06F 1/1686* (2013.01); *G06F 3/038* (2013.01);
(Continued)

(58) Field of Classification Search
CPC ....... G06F 3/04817; G06F 2203/04805; G06F 3/1454–3/1462; G06F 3/146; G06F 2203/0383; G06T 19/006; G09G 2356/00
See application file for complete search history.

(56) References Cited

U.S. PATENT DOCUMENTS 7,188,139 B1 3/2007 Ayatsuka et al.
2003/0146846 A1 8/2003 Fujita et al.
(Continued)

FOREIGN PATENT DOCUMENTS

JP 2001-142825 A 5/2001
JP 2002-062972 A 2/2002
(Continued)

OTHER PUBLICATIONS

Boring, Sebastian, et al. "Touch projector: mobile interaction through video." Proceedings of the SIGCHI Conference on Human Factors in Computing Systems. ACM, 2010.*
(Continued)

*Primary Examiner* — Jennifer To
*Assistant Examiner* — Liang Li
(74) *Attorney, Agent, or Firm* — Oblon, McClelland, Maier & Neustadt, L.L.P.

(57) ABSTRACT

An information processing system that acquires captured image data corresponding to a user interface displayed on a first display, the user interface including a plurality of graphic representations each corresponding to a respective function; and controls a second display to display a representation of the user interface based on a recognition process performed on the user interface, the representation of the user interface indicating whether a function corresponding the plurality of the graphic representations is capable of being accessed.

17 Claims, 11 Drawing Sheets

(51) Int. Cl.
*G06F 3/038* (2013.01)
*G06F 3/0482* (2013.01)
*G06F 3/14* (2006.01)
*G06F 21/36* (2013.01)

(52) U.S. Cl.
CPC .......... *G06F 3/0482* (2013.01); *G06F 3/1423* (2013.01); *G06F 21/36* (2013.01); *G06F 2203/0383* (2013.01); *G09G 2340/0464* (2013.01); *G09G 2354/00* (2013.01); *G09G 2370/06* (2013.01); *G09G 2380/14* (2013.01)

(56) References Cited

U.S. PATENT DOCUMENTS

| | | | |
|---|---|---|---|
| 2004/0024890 A1* | 2/2004 | Baek | H04L 63/10 709/229 |
| 2005/0034054 A1 | 2/2005 | Tsuyama et al. | |
| 2006/0002315 A1* | 1/2006 | Theurer | G06F 3/0481 370/261 |
| 2007/0027872 A1* | 2/2007 | Johnson | G06F 21/604 |
| 2007/0210932 A1 | 9/2007 | Koshiba et al. | |
| 2012/0102549 A1* | 4/2012 | Mazzaferri | G06F 21/6218 726/4 |
| 2012/0166997 A1* | 6/2012 | Cho | G06F 21/6218 715/778 |
| 2013/0083003 A1* | 4/2013 | Perez | G06F 3/005 345/419 |
| 2014/0283128 A1* | 9/2014 | Shepherd | G06F 3/0482 726/28 |

FOREIGN PATENT DOCUMENTS

| | | |
|---|---|---|
| JP | 2003-284031 A | 10/2003 |
| JP | 2006-081028 A | 3/2006 |
| JP | 2007-243726 A | 9/2007 |
| JP | 2007-334633 A | 12/2007 |
| JP | 2009-246646 A | 10/2009 |

OTHER PUBLICATIONS

International Search Report dated Jan. 15, 2013 in PCT/JP2012/006382.

\* cited by examiner

[Fig. 1]
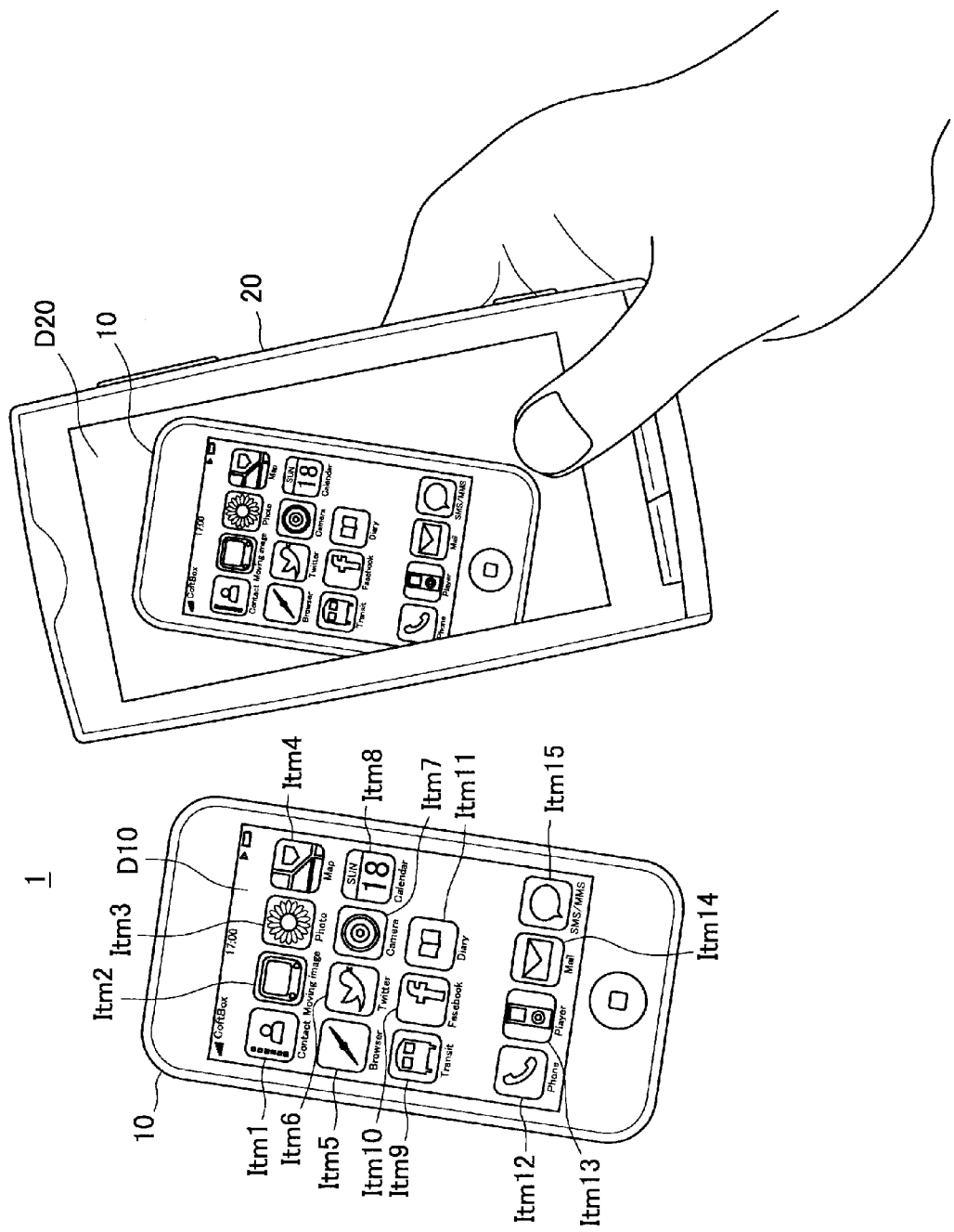

[Fig. 2]
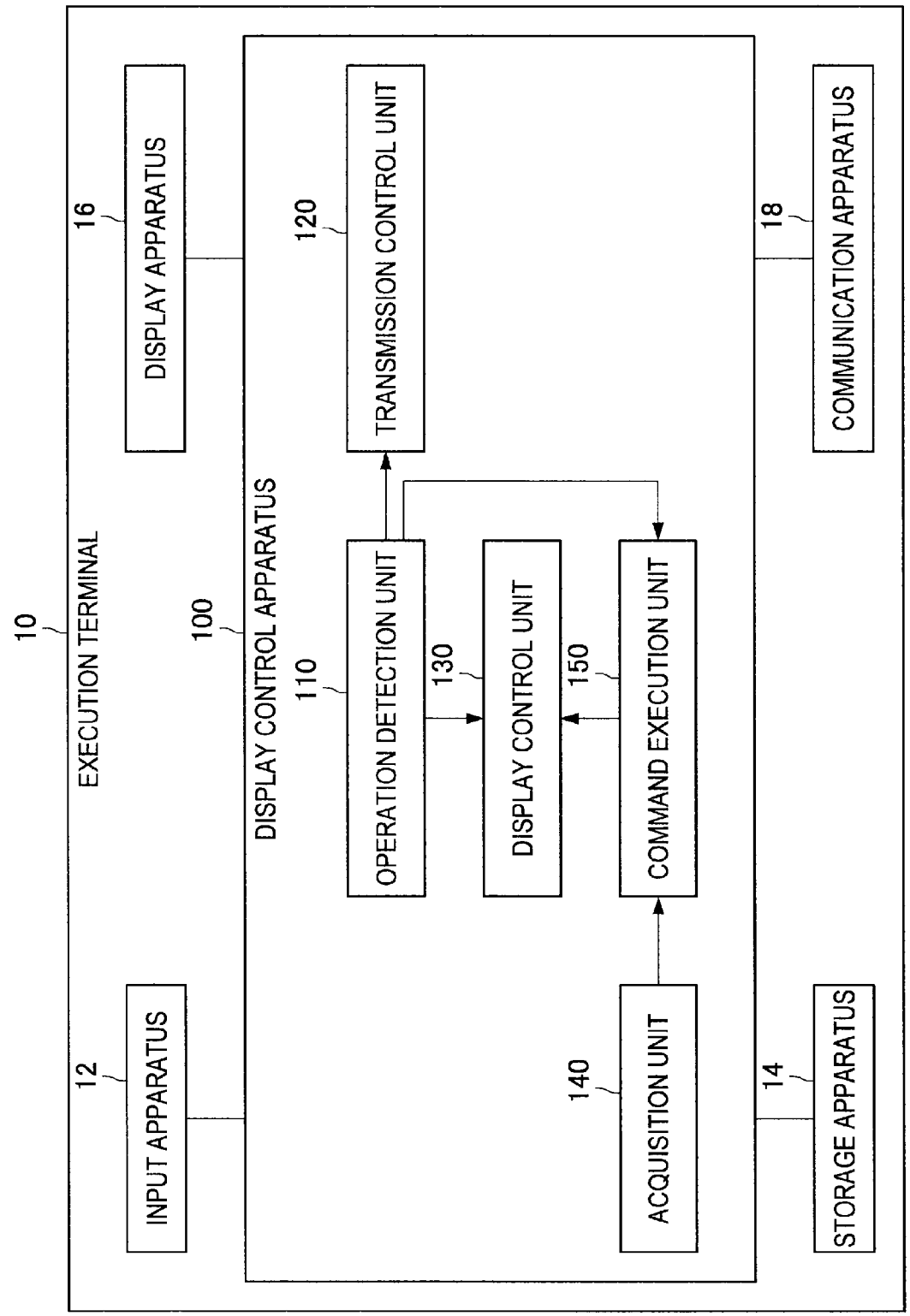

[Fig. 3]
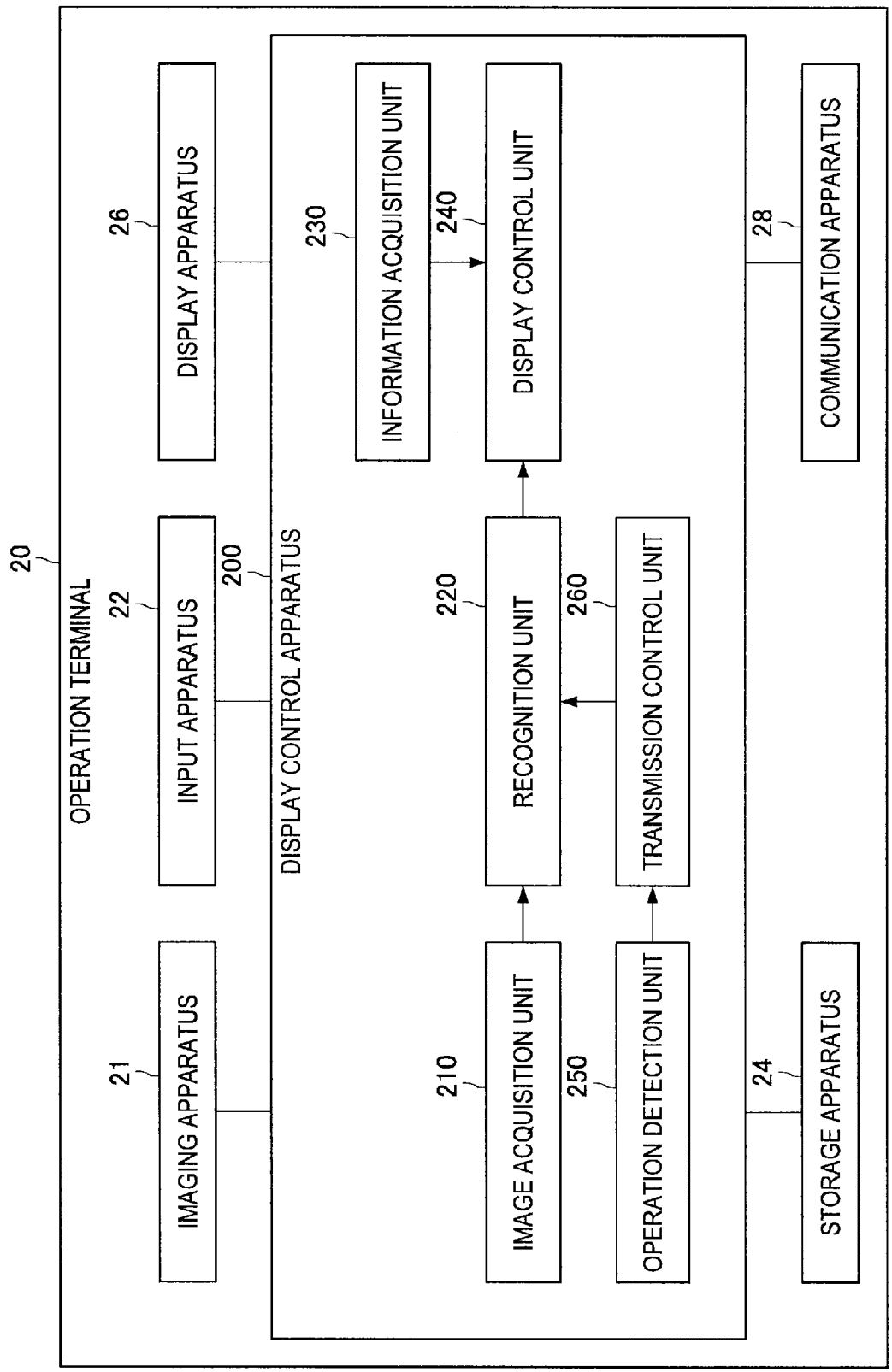

[Fig. 4]

| CONFIGURATION INFORMATION | AUTHORITY INFORMATION |
|---|---|
| (X1, Y1, W1, H1) | PERMISSION |
| (X2, Y2, W2, H2) | RESTRICTION |
| (X3, Y3, W3, H3) | PERMISSION |
| (X4, Y4, W4, H4) | PERMISSION |
| (X5, Y5, W5, H5) | PERMISSION |
| (X6, Y6, W6, H6) | PERMISSION |
| (X7, Y7, W7, H7) | PERMISSION |
| (X8, Y8, W8, H8) | PERMISSION |
| (X9, Y9, W9, H9) | PERMISSION |
| (X10, Y10, W10, H10) | RESTRICTION |
| (X11, Y11, W11, H11) | RESTRICTION |
| (X12, Y12, W12, H12) | PERMISSION |
| (X13, Y13, W13, H13) | PERMISSION |
| (X14, Y14, W14, H14) | PERMISSION |
| (X15, Y15, W15, H15) | PERMISSION |

TRANSMISSION INFORMATION

[Fig. 5]
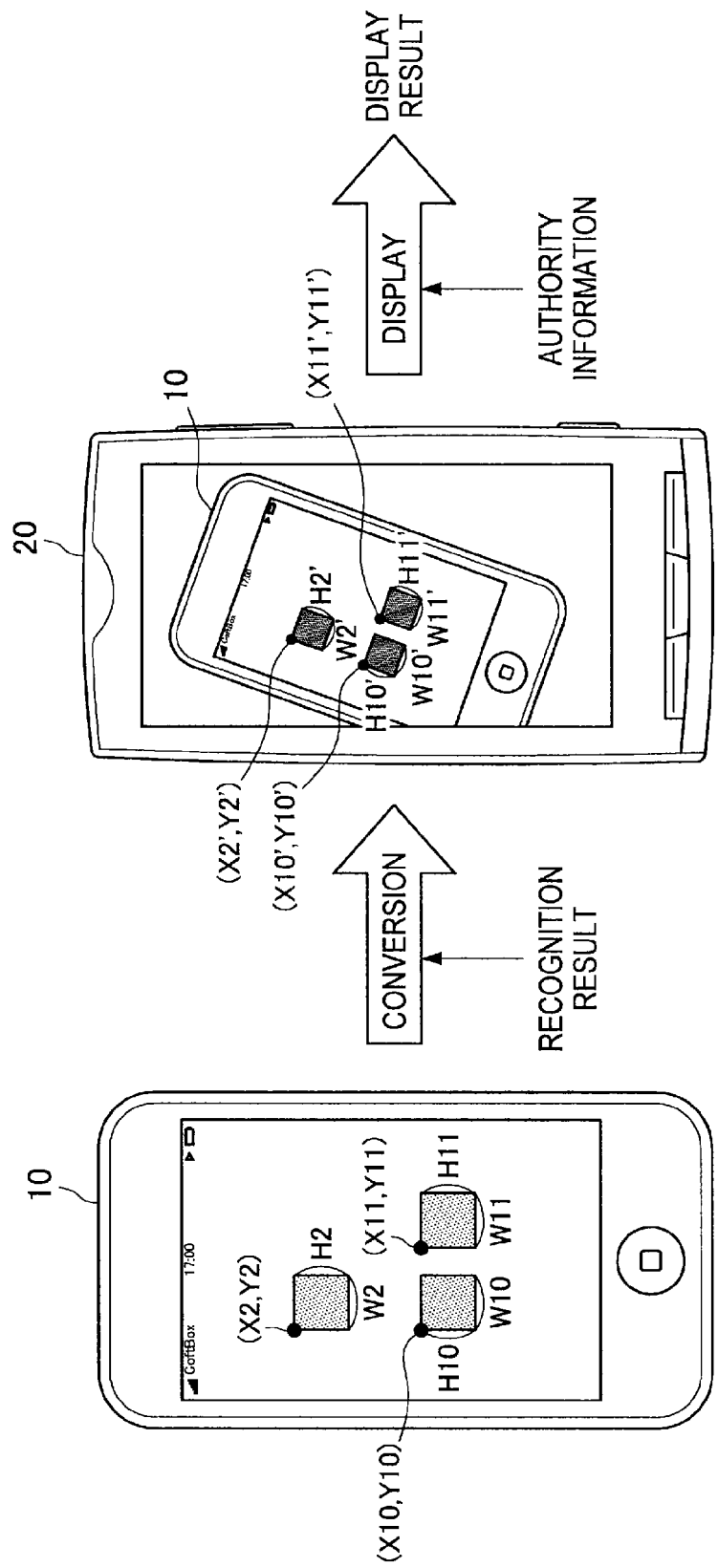

[Fig. 6]
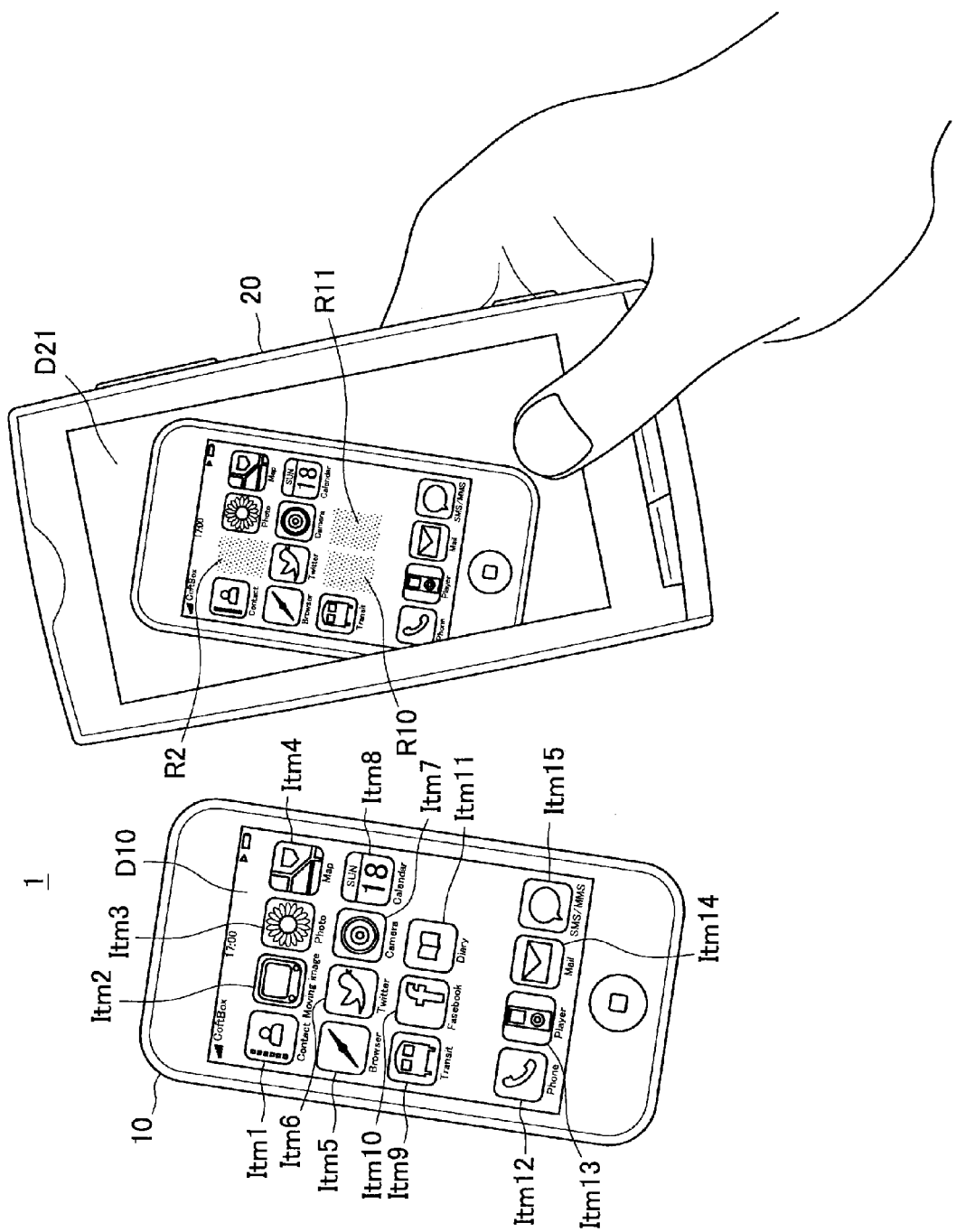

[Fig. 7]
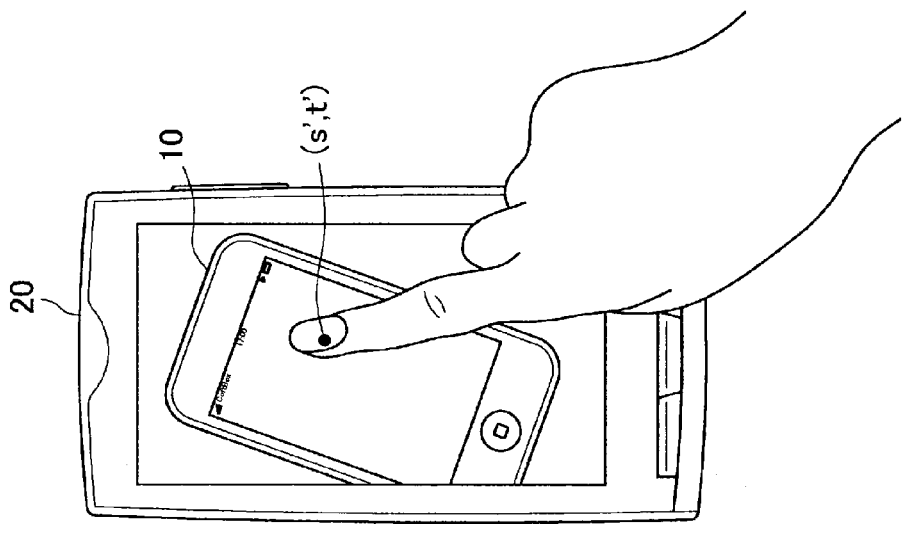
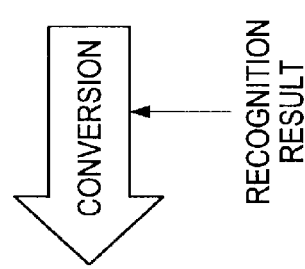
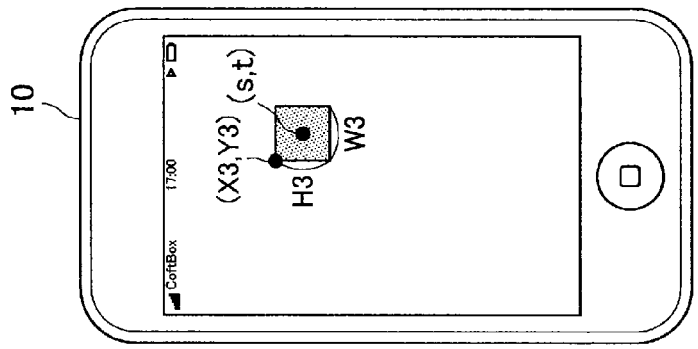
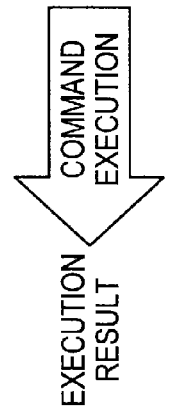

[Fig. 8]
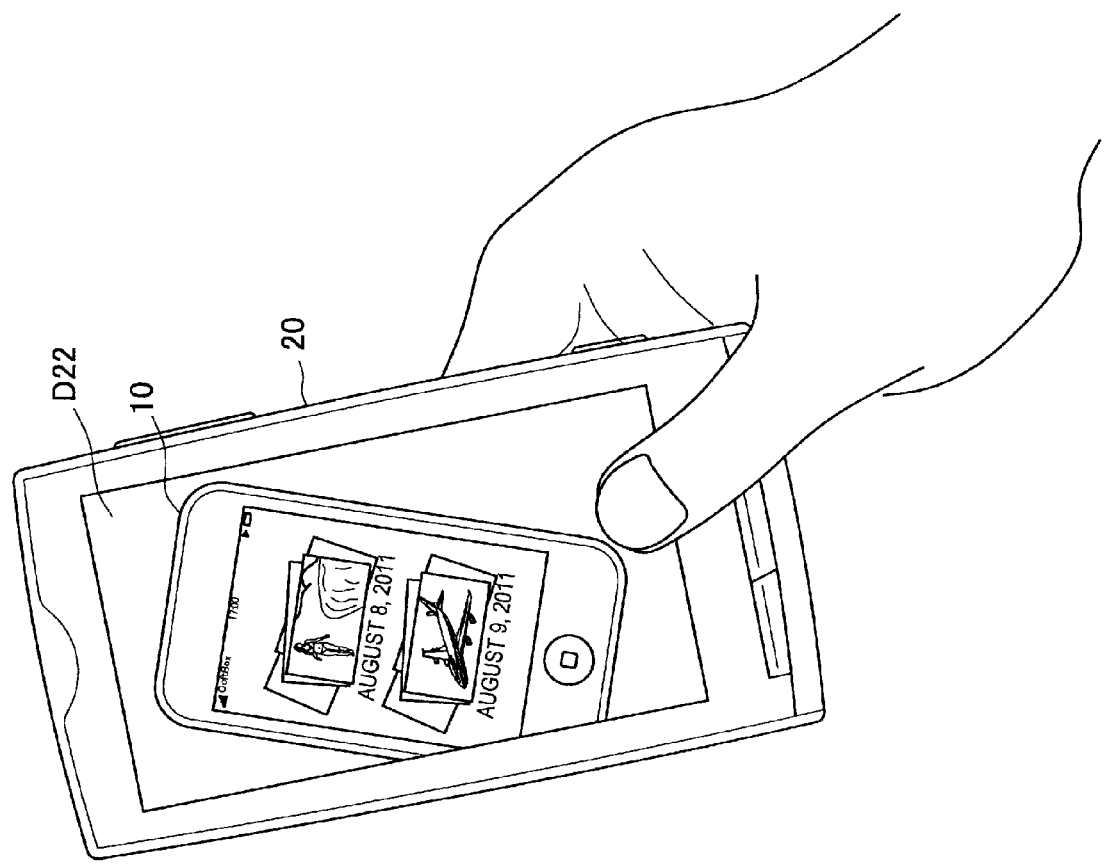
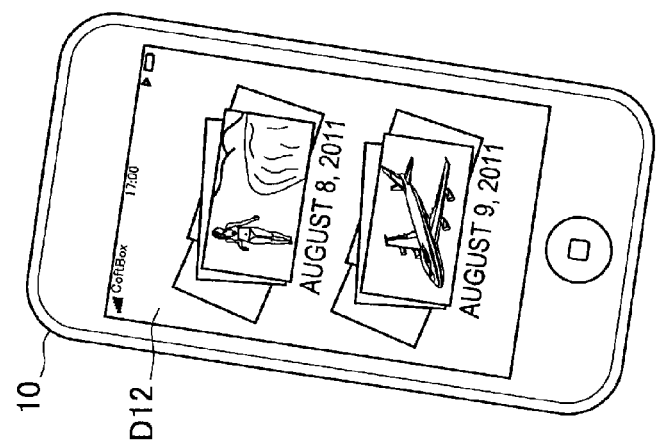

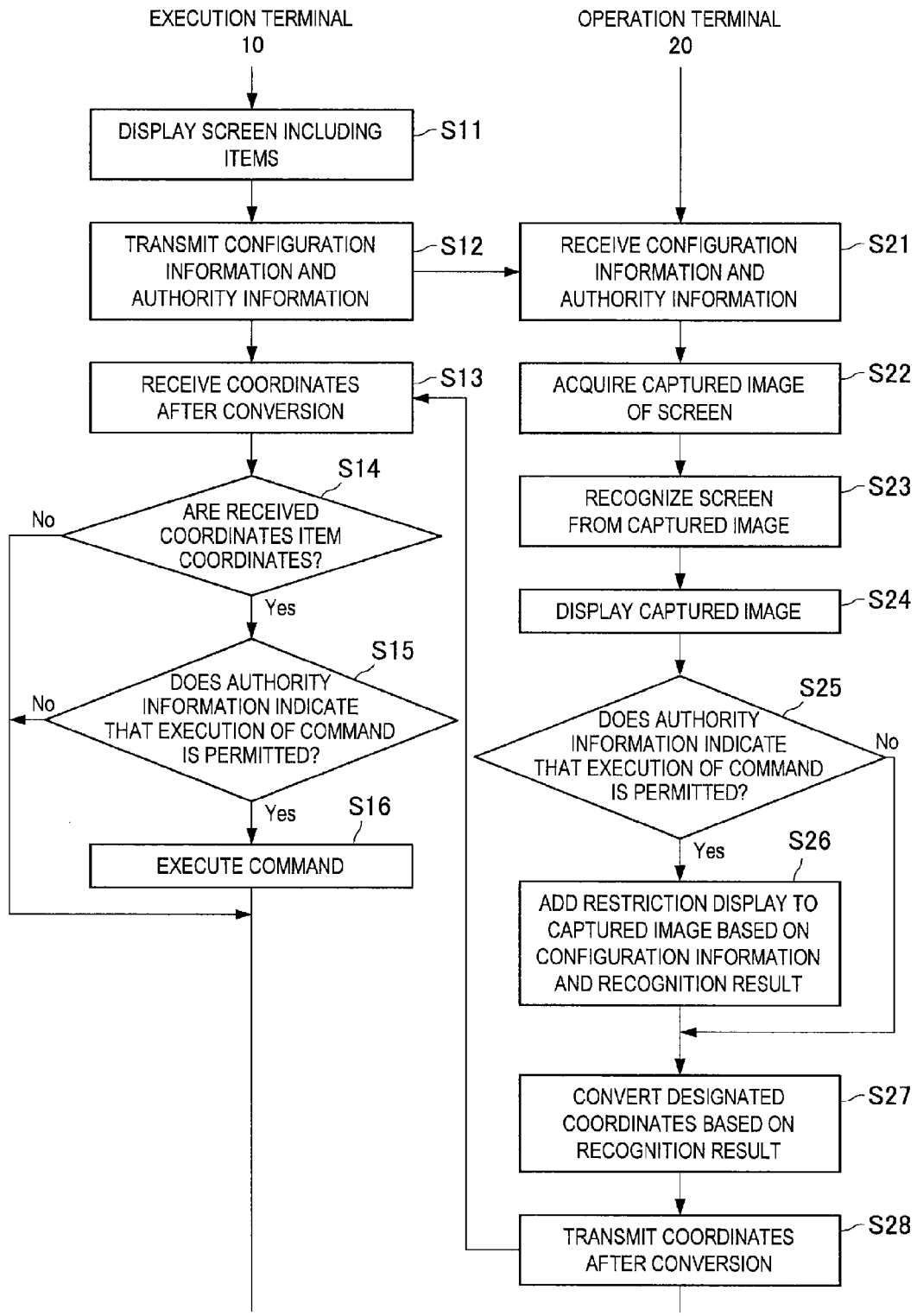
[Fig. 9]

[Fig. 10]

| COMMAND IDENTIFICATION INFORMATION | CONFIGURATION INFORMATION | AUTHORITY INFORMATION |
|---|---|---|
| COM1 | (X1, Y1, W1, H1) | PERMISSION |
| COM2 | (X2, Y2, W2, H2) | RESTRICTION |
| COM3 | (X3, Y3, W3, H3) | PERMISSION |
| COM4 | (X4, Y4, W4, H4) | PERMISSION |
| COM5 | (X5, Y5, W5, H5) | PERMISSION |
| COM6 | (X6, Y6, W6, H6) | PERMISSION |
| COM7 | (X7, Y7, W7, H7) | PERMISSION |
| COM8 | (X8, Y8, W8, H8) | PERMISSION |
| COM9 | (X9, Y9, W9, H9) | PERMISSION |
| COM10 | (X10, Y10, W10, H10) | RESTRICTION |
| COM11 | (X11, Y11, W11, H11) | RESTRICTION |
| COM12 | (X12, Y12, W12, H12) | PERMISSION |
| COM13 | (X13, Y13, W13, H13) | PERMISSION |
| COM14 | (X14, Y14, W14, H14) | PERMISSION |
| COM15 | (X15, Y15, W15, H15) | PERMISSION |

TRANSMISSION INFORMATION

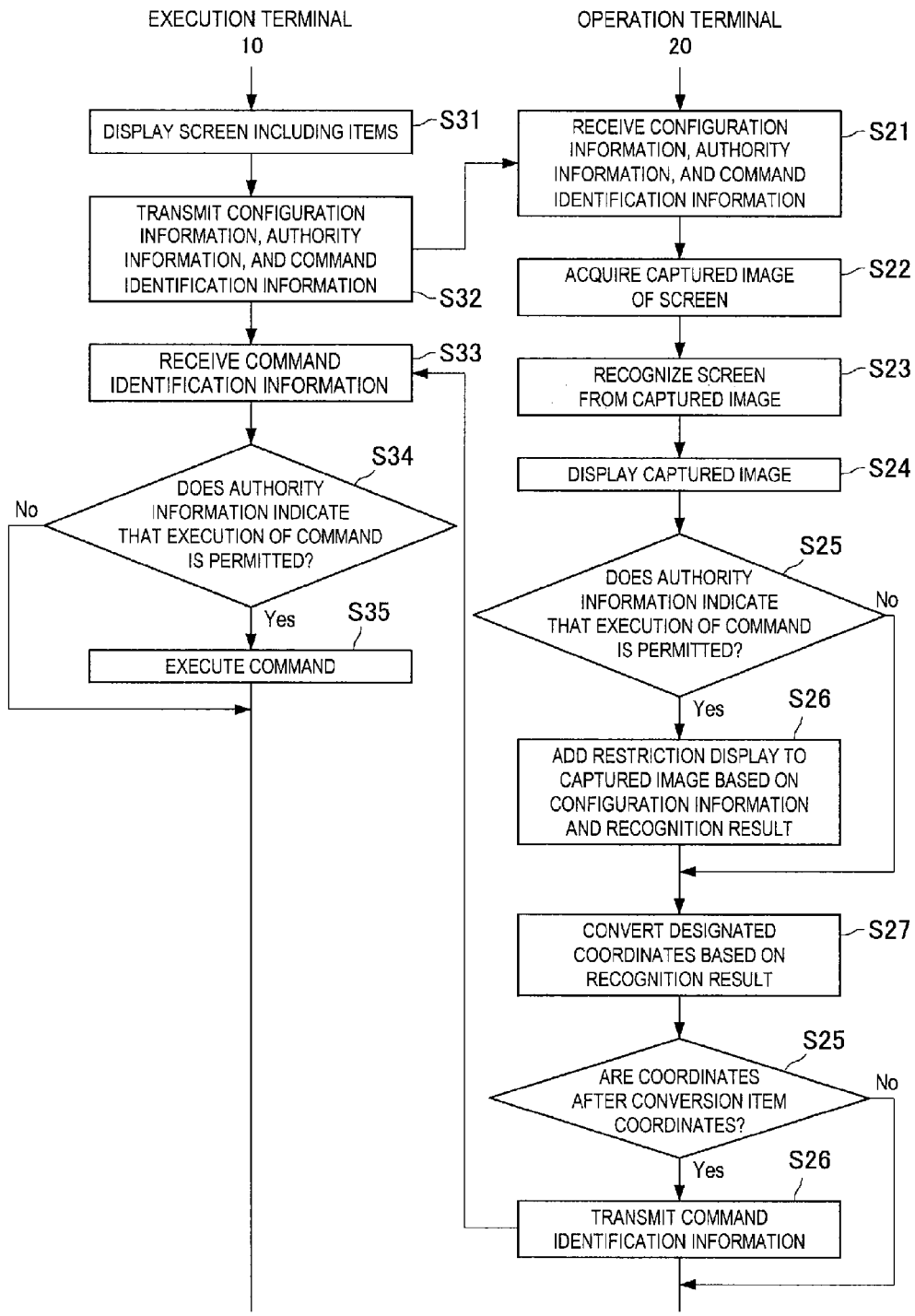
[Fig. 11]

DISPLAY CONTROL APPARATUS, DISPLAY CONTROL METHOD, AND PROGRAM

TECHNICAL FIELD

The present disclosure relates to a display control apparatus, a display control method, and a program.

BACKGROUND ART

Recently, an image recognition technology has been highly developed, and is now able to recognize a position or posture of a real object (for example, an object such as a signboard or building) included in an input image from an imaging apparatus. As an application example of object recognition as described above, augmented reality (AR) application is known. According to the AR application, a virtual object (for example, advertisement information, navigation information, or information for a game) associated with a real object can be superimposed on the real object included in a real-space image.

On the other hand, a remote desktop technology is known as the technology in which the execution of a command by an execution terminal is controlled using an operation terminal according to a remote operation. If the remote desktop technology is used, for example, a right to execute the command can be assigned to the operation terminal. For example, the execution of the command can be controlled using the operation terminal if the execution of the command is permitted, but the control of the command execution using the operation terminal is restricted if the command execution is restricted. The remote desktop technology as described above is disclosed, for example, in Patent Literature (PTL) 1.

CITATION LIST

Patent Literature

PTL 1: JP 2007-334633A

SUMMARY

Technical Problem

However, a technology for allowing a user to easily recognize a command whose execution is restricted when a terminal to be operated by the user controls the command execution by another terminal using a recognition result of a screen subjected to display control by the other terminal has not been disclosed. Accordingly, it is desirable to implement a technology for allowing the user to easily recognize a command whose execution is restricted.

Solution to Problem

According to a first exemplary embodiment, the disclosure is directed to an information processing system, comprising: one or more processing units that acquire captured image data corresponding to a user interface displayed on a first display, the user interface including a plurality of graphic representations each corresponding to a respective function; and control a second display to display a representation of the user interface based on a recognition process performed on the user interface, the representation of the user interface indicating whether a function corresponding the plurality of the graphic representations is capable of being accessed.

The system may include a user interface that receives a selection of one of the plurality of graphic representations displayed in the representation of user interface displayed on the second display, and a communication interface, wherein the one or more processing units control the communication interface to transmit information corresponding to the selection of the one of the plurality of graphic representations displayed in the representation of user interface displayed on the second display to an information processing apparatus including the first display.

According to another exemplary embodiment, the disclosure is directed to an information processing method performed by an information processing system, the method comprising: acquiring captured image data corresponding to a user interface displayed on a first display, the user interface including a plurality of graphic representations each corresponding to a respective function; and controlling a second display to display a representation of the user interface based on a recognition process performed on the user interface, the representation of the user interface indicating whether a function corresponding the plurality of the graphic representations is capable of being accessed.

According to another exemplary embodiment, the disclosure is directed to a non-transitory computer-readable medium including computer program instructions, which when executed by an information processing system, cause the information processing system to perform a process, the process comprising: acquiring captured image data corresponding to a user interface displayed on a first display, the user interface including a plurality of graphic representations each corresponding to a respective function; and controlling a second display to display a representation of the user interface based on a recognition process performed on the user interface, the representation of the user interface indicating whether a function corresponding the plurality of the graphic representations is capable of being accessed.

Advantageous Effects of Invention

According to the embodiments of the present disclosure described above, it is possible to enable a user to easily recognize a command whose execution is restricted when a terminal to be operated by the user controls the command execution by another terminal using a recognition result of a screen subjected to display control by the other terminal.

BRIEF DESCRIPTION OF DRAWINGS

FIG. 1 is an explanatory diagram illustrating a configuration of a display control system according to an embodiment of the present disclosure.

FIG. 2 is a block diagram illustrating a functional configuration example of an execution terminal.

FIG. 3 is a block diagram illustrating a functional configuration example of an operation terminal.

FIG. 4 is a diagram illustrating an example of information that is transmitted by the execution terminal to the operation terminal.

FIG. 5 is a diagram illustrating display control by a display control unit of the operation terminal.

FIG. 6 is a diagram illustrating an example of a screen displayed according to the display control by the display control unit of the operation terminal.

FIG. 7 is a diagram illustrating transmission control by a transmission control unit of the operation terminal.

FIG. 8 is a diagram illustrating an example of a command execution result.

FIG. 9 is a flowchart illustrating a flow of an operation of a display control system according to an embodiment of the present disclosure.

FIG. 10 is a diagram illustrating an example of transmission information according to a modified example of the embodiment of the present disclosure.

FIG. 11 is a flowchart illustrating a flow of an operation of a display control system according to the modified example of the embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the drawings, a plurality of constituent elements having substantially identical functional configurations are distinguished by different alphabetic characters following the same reference numerals. However, when it is not necessary to distinguish among the plurality of constituent elements having the substantially identical functional configurations, only the same reference numerals are used.

In addition, "Description of Embodiments" will be described in the following order.

1. Overview of Display Control System
2. Functional Configuration Example of Execution Terminal
3. Functional Configuration Example of Operation Terminal
4. Functions Provided in Display Control Apparatus
5. Operation of Display Control System
6. Modified Example
7. Conclusion <1. Overview of Display Control System>

Hereinafter, first, the overview of the display control system according to an embodiment of the present disclosure will be described with reference to FIG. 1.

FIG. 1 is an explanatory diagram illustrating a configuration of the display control system according to the embodiment of the present disclosure. As illustrated in FIG. 1, the display control system 1 according to the embodiment of the present disclosure includes an execution terminal 10 and an operation terminal 20. The execution terminal 10 can display a screen including one or more items. The number of items is not particularly limited. In an example illustrated in FIG. 1, a screen D10 including items Itm1 to Itm15 is displayed by the execution terminal 10. These items may each correspond, for example, to respective applications implemented by the execution terminal 10.

The operation terminal 20 can image a screen displayed by the execution terminal 10. In the example illustrated in FIG. 1, the screen D10 displayed by the execution terminal 10 is imaged by the operation terminal 20. In addition, in the example illustrated in FIG. 1, an image obtained by imaging (hereinafter referred to as "a captured image") is included in a screen D20 displayed by the operation terminal 20. This "captured image" may correspond to an image that is presently being captured and displayed as screen D20, or may be an image previously captured and stored by that is subsequently displayed as screen D20. Here, if the user performs an operation of selecting an item for the operation terminal 20, the execution terminal 10 executes a command corresponding to the item.

For example, if the user performs an operation of selecting the item Itm3 for the operation terminal 20, the execution terminal 10 executes a command "Transition to Photo Selection Screen" corresponding to the item Itm3.

Although smart phones are illustrated as examples of the execution terminal 10 and the operation terminal 20 in FIG. 1, neither of the execution terminal 10 and the operation terminal 20 is limited to the smart phone. For example, the execution terminal 10 and the operation terminal 20 may each be personal digital assistants (PDA), portable phones, portable music playback apparatus, portable video processing apparatus, or portable game devices.

Incidentally, the case in which the control of command execution from the operation terminal 20 is desired to be restricted is also considered. For example, if a user of the execution terminal 10 does not desire to arbitrarily show a moving image to other persons, there is a case in which the execution of a command "Transition to Moving-Image Selection Screen" is desired to be prohibited even when an operation of selecting the item Itm2 for the operation terminal 20 is performed. In such a case, it is possible to assign a right to execute the command to the operation terminal. At this time, if it is possible to enable a user of the operation terminal 20 to easily recognize a command whose execution is restricted, convenience for the user of the operation terminal 20 may be improved.

The embodiments of the present disclosure have been made in view of the above-described circumstances. According to the embodiment of the present disclosure, the operation terminal 20 can enable the user of the operation terminal 20 to easily recognize a command whose execution is restricted when the control of command execution by the execution terminal 10 is performed using a recognition result of a screen displayed by the execution terminal 10. Hereinafter, a functional configuration of the execution terminal 10 according to the embodiment of the present disclosure will be described with reference to FIG. 2.

<2. Functional Configuration Example of Execution Terminal>

FIG. 2 is a block diagram illustrating the functional configuration example of the execution terminal 10. Referring to FIG. 2, the execution terminal 10 includes an input apparatus 12, a storage apparatus 14, a display apparatus 16, a communication apparatus 18, and a display control apparatus 100. The display control apparatus 100 includes an operation detection unit 110, a transmission control unit 120, a display control unit 130, an acquisition unit 140, and a command execution unit 150.

(Input Apparatus)

The input apparatus 12 is an input device to be used to allow the user to operate the execution terminal 10 or input information to the execution terminal 10. The input apparatus 12 can include, for example, a keyboard, a keypad, a mouse, a button, a switch, or a touch panel. The input apparatus 12 may include a gesture recognition module that recognizes a gesture of the user.

(Storage Apparatus)

The storage apparatus 14 stores data and programs for processing by the execution terminal 10 using a storage medium such as a semiconductor memory or a hard disk. For example, the storage apparatus 14 stores a program for display control of a screen including items. Further, for example, the storage apparatus 14 stores a program for executing a command corresponding to the item.

(Display Apparatus)

The display apparatus 16 is a display module constituted by a liquid crystal display (LCD), an organic light-emitting diode (OLED), or a cathode ray tube (CRT). The display apparatus 16 may be a part of the execution terminal 10 or may be configured separately from the execution terminal 10.

(Communication Apparatus)

The communication apparatus 18 is a communication interface that communicates with the operation terminal 20 in a wired or wireless manner. When connected to a network, the communication apparatus 18 may communicate with the operation terminal 20 via the network. In addition, the communication apparatus 18 may directly communicate with the operation terminal 20 without involving the network. For example, the communication apparatus 18 may perform near-field wireless communication by radio waves or infrared communication with the operation terminal 20.

(Display Control Apparatus)

The display control apparatus 100 corresponds to a processor such as a central processing unit (CPU) or a digital signal processor (DSP). The display control apparatus 100 operates various functions of the display control apparatus 100 to be described later by executing a program stored in the storage apparatus 14 or another storage medium. The display control apparatus 100 may not be embedded in the execution terminal 10, and may be embedded in another apparatus (for example, a server).

The functional configuration of the execution terminal 10 according to the embodiment of the present disclosure has been described above with reference to FIG. 2. Hereinafter, a functional configuration of the operation terminal 20 according to the embodiment of the present disclosure will be described in detail with reference to FIG. 3.

<3. Functional Configuration Example of Operation Terminal>

FIG. 3 is a block diagram illustrating the functional configuration example of the operation terminal 20. Referring to FIG. 3, the operation terminal 20 includes an imaging apparatus 21, an input apparatus 22, a storage apparatus 24, a display apparatus 26, a communication apparatus 28, and a display control apparatus 200. The display control apparatus 200 includes an image acquisition unit 210, a recognition unit 220, an information acquisition unit 230, a display control unit 240, an operation detection unit 250, and a transmission control unit 260.

(Imaging Apparatus)

The imaging apparatus 21 generates a captured image by imaging a real space using an imaging element such as a charge coupled device (CCD) or a complementary metal oxide semiconductor (CMOS). Although the imaging apparatus 21 is assumed to be a part of the operation terminal 20 in the embodiment of the present disclosure, the imaging apparatus 21 may be configured separately from the operation terminal 20.

(Input Apparatus)

The input apparatus 22 is an input device to be used to allow the user to operate the operation terminal 20 or input information to the operation terminal 20. The input apparatus 22 can include, for example, a keyboard, a keypad, a mouse, a button, a switch, or a touch panel. The input apparatus 22 may include a gesture recognition module that recognizes a gesture of the user.

(Storage Apparatus)

The storage apparatus 24 stores data and programs for processing by the operation terminal 20 using a storage medium such as a semiconductor memory or a hard disk. In addition, the storage apparatus 24 stores a feature quantity dictionary to be used for object recognition and virtual object data, which is data of a virtual object serving as a display target. Further, the storage apparatus 24 can store a recognition result generated as an object recognition result.

(Display Apparatus)

The display apparatus 26 is a display module constituted by a liquid crystal display (LCD), an organic light-emitting diode (OLED), or a cathode ray tube (CRT). The display apparatus 26 may be a part of the operation terminal 20, or may be configured separately from the operation terminal 20.

(Communication Apparatus)

The communication apparatus 28 is a communication interface that communicates with the execution terminal 10 in a wired or wireless manner. When connected to a network, the communication apparatus 28 may communicate with the execution terminal 10 via the network. In addition, the communication apparatus 28 may directly communicate with the execution terminal 10 without involving the network. For example, the communication apparatus 28 may perform near-field wireless communication by radio waves or infrared communication with the execution terminal 10.

(Display Control Apparatus)

The display control apparatus 200 corresponds to a processor such as a central processing unit (CPU) or a digital signal processor (DSP). The display control apparatus 200 operates various functions of the display control apparatus 200 to be described later by executing a program stored in the storage apparatus 24 or another storage medium. The display control apparatus 200 may not be embedded in the operation terminal 20, or may be embedded in another apparatus (for example, a server).

The functional configuration of the operation terminal 20 according to the embodiment of the present disclosure has been described above with reference to FIG. 3. Hereinafter, the display control apparatus 100 and 200 according to the embodiment of the present disclosure will be described in detail with reference to FIGS. 4 to 8.

<4. Functions Provided in Display Control Apparatus>

FIG. 4 is a diagram illustrating an example of information (hereinafter referred to as "transmission information") that is transmitted by the execution terminal 10 to the operation terminal 20. As illustrated in FIG. 4, the transmission information includes configuration information and authority information. The configuration information indicates a configuration of a screen including one or more items. The display control unit 130 can display the screen according to the configuration information. In the example illustrated in FIG. 4, the configuration information indicates positions and sizes of the items Itm1 to Itm15 constituting the screen D10.

A position of an item can be expressed by a position of a predetermined point of the item, for example, when the item position is based on the position of the predetermined point of the screen. For example, a top-left corner of the screen D10 can be a predetermined point of the screen, but a predetermined point of the screen may not be the top left corner of the screen D10. In addition, a top left corner of the item can be a predetermined point of the item, but a predetermined point of the item may not be the top left corner of the item. In addition, although coordinates of the item are expressed by expressing a position of a predetermined point of the screen D10 as (0, 0), expressing positions of predetermined points of the items Itm1 to Itm15 as (X1, Y1) to (X15, Y15), and expressing sizes (Width, Height) of the items Itm1 to Itm15 as (W1, H1) to (W15, H15) in the example illustrated in FIG. 4, a type of expression is not particularly limited.

For example, instead of coordinates of each item, a size of an interval between items and a size of an interval between a screen end and the item may be included in transmission information as configuration information. In this case, information indicating that execution of a command is permitted or information indicating that the execution of the command is restricted as will be described later may be arranged in order of item number. In addition, if each item has a shape other than a rectangle, the coordinates of each item can be defined in another type of expression. For example, each item may be a point, but, in this case, the size of each item may not be included in the transmission information as the configuration information. Further, for example, if the size of each item is already recognized by the operation terminal 20, the size of each item may not be included in the transmission information as the configuration information.

The authority information is constituted by information (hereinafter simply referred to as "permission") indicating that the execution of the command is permitted or information (hereinafter simply referred to as "restriction") indicating that the execution of the command is restricted. In the example illustrated in FIG. 4, "permission" or "restriction" is associated with the execution of a command to be executed from each of the items Itm1 to Itm15. The authority information may be set, for example, if a setting operation from the user has been detected by the operation detection unit 110. The setting operation is input, for example, by the input apparatus 12 from the user.

Although the execution of the command is prohibited if the execution of the command is restricted in what follows, the execution of the command may not be prohibited. In addition, the restriction for the execution of the command may be imposed step by step. If the transmission control unit 120 controls the transmission information to be transmitted to the operation terminal 20, the transmission information is transmitted by the communication apparatus 18 to the operation terminal 20 according to the control. For example, if the operation detection unit 110 has detected a transmission operation from the user, the transmission information may be transmitted. The transmission operation is input, for example, by the input apparatus 12 from the user.

The transmission information transmitted from the execution terminal 10 is received by the communication apparatus 28 of the operation terminal 20. The information acquisition unit 230 of the display control apparatus 200 can acquire the transmission information received by the communication apparatus 28. On the other hand, the image acquisition unit 210 acquires a captured image of the screen D10. The captured image of the screen D10 can be obtained, for example, according to imaging by the imaging apparatus 21 of the operation terminal 20. The display control unit 240 may control the captured image acquired by the image acquisition unit 210 to be displayed. The display apparatus 26 can perform a display according to display control by the display control unit 240. For example, in the example illustrated in FIG. 1, the display control unit 240 controls the captured image to be displayed as the screen D20.

The recognition unit 220 acquires a recognition result by recognizing the screen D10. For example, the recognition unit 220 recognizes the screen D10 included in the captured image acquired by the image acquisition unit 210 and a position and posture in the captured image of the screen D10. For example, the recognition unit 220 can recognize the screen included in the captured image by matching a feature quantity determined from the captured image against a feature quantity of the screen D10.

More specifically, the recognition unit 220 determines a feature quantity of a real object within the captured image according to a feature-quantity determination method such as a scale invariant feature transform (SIFT) method or a random ferns method, and matches the determined feature quantity against the feature quantity of the real object. The recognition unit 220 recognizes information for identifying the screen D10 associated with a feature quantity best matching with the feature quantity of the real object within the captured image and a position and posture of the screen D10 in the captured image.

Here, the recognition unit 220 uses a feature-quantity dictionary in which the feature-quantity data of the real object is associated with information for identifying the real object. The feature-quantity dictionary may be stored by the storage apparatus 24 or received by the communication apparatus 28 from the server. The feature-quantity data of the real object may be, for example, a set of feature quantities determined from a learning image of the real object according to the SIFT method or the random ferns method.

The recognition of the screen D10 is not limited to this example. For example, the recognition unit 220 may indirectly recognize the screen D10 by recognizing a known graphic or symbol or a marker such as an artificial marker (for example, a barcode or quick response (QR) code) or a natural marker associated with the screen D10. In addition, the recognition unit 220 may recognize the screen D10 and recognize the position and posture of the screen D10 from the size and shape in the captured image of the screen D10.

In addition, although an example in which the recognition unit 220 recognizes the position and posture of the screen D10 included in the captured image according to image processing has been described above, a technique of recognizing the position and posture of the screen D10 is not limited to a recognition technique based on the image processing. For example, the recognition unit 220 can detect a direction of the imaging apparatus 21 and a current location of the operation terminal 20, and estimate the screen D10 included in the captured image and the position and posture of the screen D10 in the captured image based on the detection result.

FIG. 5 is a diagram illustrating display control by the display control unit 240. The display control unit 240 performs control so that a restriction display, which is a display indicating that the execution of the command is restricted, is performed based on the configuration information and the screen recognition result if the authority information indicates the execution of the command is restricted (the case of "restriction"). For example, the display control unit 240 can add the restriction display to the captured image acquired by the image acquisition unit 210.

If the configuration information and the authority information as illustrated in FIG. 4 have been acquired by the information acquisition unit 230, "restriction" is associated with item coordinates (X2, Y2, W2, H2), (X10, Y10, W10, H10), and (X11, Y11, W11, H11). Accordingly, it is preferable that the display control unit 240 control the restriction display to be performed based on the item coordinates (X2, Y2, W2, H2), (X10, Y10, W10, H10), and (X11, Y11, W11, H11) and the recognition result of the screen D10.

For example, if the position and posture of the screen D10 have been recognized as the recognition result of the screen D10, the display control unit 240 converts item coordinates (X2, Y2, W2, H2), (X10, Y10, W10, H10), and (X11, Y11, W11, H11) based on the position and posture of the screen D10. Coordinates (hereinafter referred to as "converted coordinates") after the display control unit 240 has converted the item coordinates are illustrated as (X2', Y2', W2', H2'), (X10', Y10', W10', H10'), and (X11', Y11', W11', H11') in FIG. 5.

The display control unit 240 can add the restriction display to a position indicated by the converted coordinates. In the example illustrated in FIG. 5, the display control unit 240 can add the restriction display to positions indicated by the converted coordinates (X2', Y2', W2', H2'), (X10', Y10', W10', H10'), and (X11', Y11', W11', H11'). The display apparatus 26 can perform a display according to display control by the display control unit 240.

FIG. 6 is a diagram illustrating an example of a screen displayed according to the display control by the display control unit 240. In the example illustrated in FIG. 6, a captured image in which restriction displays R2, R10, and R11 are added to positions indicated by the converted coordinates (X2', Y2', W2', H2'), (X10', Y10', W10', H10'), and (X11', Y11', W11', H11') is displayed as a screen D21. Although the items are grayed out by the restriction displays R2, R10, and R11 in the example illustrated in FIG. 6, a restriction display method is not particularly limited. For example, the restriction display may be a display from which each item is deleted.

If the restriction display is made as described above, the display control apparatus 200 enables the user to easily recognize a command whose execution is restricted when the control of the command execution by the display control apparatus 100 is performed using the recognition result of a screen subjected to display control by the display control apparatus 100. In the example illustrated in FIG. 6, the user easily recognizes that the authority is restricted for each of a command "Transition to Moving-Image Selection Screen" corresponding to the item Itm2, a command "Fasebook" corresponding to the item Itm10, and a command "Diary" corresponding to the item Itm11.

The user can select the command whose execution is permitted while browsing the screen D11 in which the restriction display is made as described above. In the example illustrated in FIG. 6, the user can select one of the items Itm1, Itm3 to Item9, and Itm12 to Itm15. Here, for example, the user desires to input an operation of designating coordinates on the screen to the input apparatus 22 as designated coordinates (s', t'). In this case, the operation detection unit 250 detects an operation of designating the designated coordinates (s', t').

FIG. 7 is a diagram illustrating transmission control by the transmission control unit 260. As illustrated in FIG. 7, for example, if the operation detection unit 250 has detected an operation of designating the designated coordinates (s', t'), the transmission control unit 260 converts the designated coordinates (s', t') based on a position and posture of the screen D10. Coordinates after the conversion of the designated coordinates (s', t') are denoted by (s, t). The transmission control unit 260 controls the coordinates (s, t) to be transmitted to the display control apparatus 100. If the coordinates (s, t) are controlled to be transmitted by the transmission control unit 260 to the display control apparatus 100, the coordinates (s, t) are transmitted by the communication apparatus 28 to the execution terminal 10 according to the control.

The coordinates (s, t) transmitted by the communication apparatus 28 are received by the communication apparatus 18 of the execution terminal 10. Subsequently, if the coordinates (s, t) are received by the communication apparatus 18, the acquisition unit 140 of the display control apparatus 100 acquires the coordinates (s, t) received by the communication apparatus 18. If the item coordinates have been acquired by the acquisition unit 140 and the authority information indicates that the execution of the command is permitted (the case of "permission"), the command execution unit 150 executes the command. Because "permission" is associated with the item Itm3 as illustrated in FIG. 4, it is preferable that the command execution unit 150 execute the command "Transition to Photo Selection Screen" corresponding to the item Itm3 if the coordinates (s, t) acquired by the acquisition unit 140 are consistent with the coordinates (for example, coordinates within a range defined by (X3, Y3, W3, H3)) of the item Itm3 as illustrated in FIG. 7.

FIG. 8 is a diagram illustrating an example of a command execution result. If the command execution unit 150 has executed the command "Transition to Photo Selection Screen" corresponding to the item Itm3, the display control unit 130 controls a screen D12 corresponding to a photo selection screen to be displayed as illustrated in FIG. 8. If the display control by the display control unit 130 is performed, the screen D12 is displayed by the display apparatus 16 according to the display control. In addition, in the example illustrated in FIG. 8, if the imaging apparatus 21 images the screen D12 and the image acquisition unit 210 acquires a captured image, the display control unit 240 controls the captured image to be displayed as a screen D22.

If the acquisition unit 140 does not acquire item coordinates, it is preferable that the command execution unit 150 not execute the command. In addition, if the authority information indicates that the execution of the command is restricted (the case of "restriction"), it is preferable that the command execution unit 150 restrict the execution of the command. For example, if coordinates (s, t) acquired by the acquisition unit 140 are coordinates of the item Itm2, it is preferable that the command execution unit 150 execute the command "Transition to Moving-Image Selection Screen" corresponding to the item Itm2 because "restriction" is associated with the item Itm2 as illustrated in FIG. 4.

In addition, although the coordinates (s, t) may be controlled to be unconditionally transmitted as described above, the transmission control unit 260 may determine whether or not a predetermined condition has been satisfied and control the coordinates (s, t) to be transmitted if the predetermined condition has been satisfied. In addition, if the predetermined condition has not been satisfied, the transmission control unit 260 may control the coordinates (s, t) not to be transmitted.

For example, if coordinates (s, t) after the conversion of designated coordinates (s', t') based on the position and posture of the screen D10 are consistent with or close to one set of item coordinates (X1, Y1, W1, H1) to (X15, Y15, W15, H15), the transmission control unit 260 controls the coordinates (s, t) to be transmitted to the display control apparatus 100. On the other hand, if the coordinates (s, t) are not consistent with or close to one set of the item coordinates (X1, Y1, W1, H1) to (X15, Y15, W15, H15), the transmission control unit 260 may control the coordinates (s, t) not to be transmitted to the display control apparatus 100. A proximity range can be preset or may not be provided.

In addition, for example, the transmission control unit 260 may control the coordinates (s, t) to be transmitted to the display control apparatus 100 if the authority information indicates that the execution of the command is permitted (the case of "permission"). On the other hand, if the authority information indicates that the execution of the command is restricted (the case of "restriction"), the transmission control unit 260 may control the coordinates (s, t) not to be transmitted to the display control apparatus 100.

The command execution unit 150 may execute a command designated according to a command designation operation if the operation detection unit 110 has detected the command designation operation from the user. In such a case, if the operation detection unit 110 has detected the command designation operation from the user, it is preferable that the command execution unit 150 execute the command regardless of the authority information. On the other hand, when the acquisition unit 140 has acquired item coordinates, it is preferable that the command execution unit 150 execute the command if the authority information indicates that the execution of the command is permitted (the case of "permission"). In addition, when the acquisition unit 140 has acquired the item coordinates, it is preferable that the command execution unit 150 restrict the execution of the command if the authority information indicates that the execution of the command is restricted (the case of "restriction"). The command designation operation is input, for example, by the input apparatus 12 from the user.

The functions provided in the display control apparatus 100 and 200 according to the embodiments of the present disclosure have been described above with reference to FIGS. 4 and 8. Hereinafter, an operation of the display control system 1 according to an embodiment of the present disclosure will be described in detail with reference to FIG. 9.

<5. Operation of Display Control System>

FIG. 9 is a flowchart illustrating a flow of the operation of the display control system 1 according to the embodiment of the present disclosure.

If the display control unit 130 of the execution terminal 10 performs display control of a screen including items as illustrated in FIG. 9, the display apparatus 16 displays the screen including the items according to display control by the display control unit 130 (step S11). The number of items is not particularly limited as described above. Subsequently, the transmission control unit 120 controls configuration information of the screen and authority information for a command to be executed from the item to be transmitted to the operation terminal 20. According to the control by the transmission control unit 120, the communication apparatus 18 transmits the configuration information and the authority information to the operation terminal 20 (step S12). As described above, the configuration information and the authority information are transmitted, for example, if the operation detection unit 110 has detected a transmission operation from the user.

Subsequently, if the communication apparatus 28 of the operation terminal 20 receives the configuration information and the authority information from the execution terminal 10 (step S21), the information acquisition unit 230 acquires the configuration information and the authority information received by the communication apparatus 28. On the other hand, if the imaging apparatus 21 images the screen subjected to the display control by the display control unit 130, the image acquisition unit 210 acquires a captured image obtained according to imaging by the imaging apparatus 21 (step S22). The recognition unit 220 recognizes the screen from the captured image (step S23). Subsequently, if the display control unit 240 performs display control of the captured image, the display apparatus 26 displays the captured image (step S24).

Subsequently, if the authority information indicates that the execution of the command is restricted ("Yes" in step S25), the display control unit 240 adds a restriction display to the captured image based on the configuration information and the recognition result (step S26), and proceeds to step S27. If the authority information does not indicate that the execution of the command is restricted (that is, if the authority information indicates that the execution of the command is permitted) ("No" in step S25), the display control unit 240 proceeds to step S27. Subsequently, if the operation detection unit 250 has detected designated coordinates from the user, the transmission control unit 260 converts the designated coordinates based on the recognition result obtained according to recognition by the recognition unit 220 (step S27), and controls the converted coordinates to be transmitted. The communication apparatus 28 transmits the converted coordinates according to the control by the transmission control unit 260 (step S28). It should be noted that while the display control unit 240 adds a restriction display to the captured image based on the configuration information and the recognition result (step S26), it is possible for a restriction display to be removed by changing a status corresponding to the command from restricted to permitted. For example, a password or other authentication information may be entered at the operation terminal 20 and transmitted to the execution terminal 10. The execution terminal 10 may then, upon successful authentication, transmit data to the operation terminal 20 indicating that a status of a command be changed from restricted to permitted. An exemplary process of entering this authentication information may include selecting one of the restriction displays R2, R10 and R11 shown in FIG. 6. Upon selection of one of these displays, the display control unit 240 controls the display to display an interface prompting a user to enter the authentication information. This authentication information is then sent from the operation terminal 20 to the execution terminal 10, as outlined above. Upon receiving the data from the execution terminal 10 indicating that the status of the command has been changed from restricted to permitted based on a successful authentication, the display control unit 240 controls the display to remove the restriction display from the captured image.

Subsequently, if the communication apparatus 18 of the execution terminal 10 receives the converted coordinates (step S13), the acquisition unit 140 acquires the coordinates received by the communication apparatus 18. If the coordinates received by the communication apparatus 18 are not item coordinates (or are not close to item coordinates) ("No" in step S14), the command execution unit 150 ends the operation without executing the command. Alternatively, the display control unit 130 may re-perform the display control (step S11). If the coordinates received by the communication apparatus 18 are item coordinates (or are close to item coordinates) ("Yes" in step S14), the command execution unit 150 proceeds to step S15.

If the authority information does not indicate that the execution of the command is permitted (that is, if the execution of the command is indicated as being restricted) ("No" in step S15), the command execution unit 150 ends the operation without executing the command. Alternatively, the display control unit 130 may re-perform the display control (step S11). If the authority information indicates that the execution of the command is permitted ("Yes" in step S15), the command execution unit 150 executes the command (step S16), and ends the operation. Alternatively, the display control unit 130 may re-perform the display control (step S11). The display control unit 130 may perform display control of the command execution result.

The operation of the display control system 1 according to the embodiment of the present disclosure has been described above with reference to FIG. 9. The functions provided in the display control apparatus 100 and 200 according to the modified example of the embodiment of the present disclosure will be described in detail with reference to FIG. 10.

<6. Modified Example>

FIG. 10 is a diagram illustrating an example of transmission information according to the modified example of the embodiment of the present disclosure. As illustrated in FIG. 10, the transmission information may include information (hereinafter referred to as "command identification information") for identifying a command in addition to configuration information and authority information. However, the command identification information is not indispensable information. If the transmission control unit 120 of the execution terminal 10 controls the transmission information as described above to be transmitted, the communication apparatus 18 transmits the transmission information. The transmission information transmitted by the communication apparatus 18 is received by the communication apparatus 28 of the operation execution 20 and acquired by the information acquisition unit 230.

Here, for example, if the operation detection unit 250 has detected an operation of designating a command, the transmission control unit 260 can control command identification information for identifying the command to be transmitted to the display control apparatus 100. Here, the transmission control unit 260 may determine whether or not a predetermined condition has been satisfied, and control the command identification information to be transmitted if the predetermined condition has been satisfied. In addition, the transmission control unit 260 may control the command identification information not to be transmitted if the predetermined condition has not been satisfied.

For example, if the operation detection unit 250 has detected an operation of designating coordinates (s', t') and coordinates (s, t) after the conversion of the designated coordinates (s', t') based on a position and posture of the screen D10 are consistent with or close to one set of item coordinates (X1, Y1, W1, H1) to (X15, Y15, W15, H15), the transmission control unit 260 can control command identification information corresponding to an item to be transmitted to the display control apparatus 100.

For example, if the operation detection unit 250 has detected the operation of designating the coordinates (s', t') and the coordinates (s, t) after the conversion of the designated coordinates (s', t') are consistent with or close to the item coordinates (X3, Y3, W3, H3), the transmission control unit 260 may control command identification information "COM3" associated with their item to be transmitted to the display control apparatus 100. Although command identification information of which the transmission is controlled by the transmission control unit 260 may be included in the transmission information, the command identification information may be an item number or the like defined by the configuration information when the command identification information is not included in the transmission information.

In addition, for example, if the authority information indicates that the execution of the command is permitted (the case of "permission"), the transmission control unit 260 may control command identification information to be transmitted to the display control apparatus 100. On the other hand, if the authority information indicates that the execution of the command is restricted (the case of "restriction"), the transmission control unit 260 may control command identification information not to be transmitted to the display control apparatus 100.

If the communication apparatus 28 transmits the command identification information according to control by the transmission control unit 260, the communication apparatus 18 of the execution terminal 10 receives the command identification information and the acquisition unit 140 acquires the command identification information received by the communication apparatus 18. If the acquisition unit 140 has acquired the command identification information and the authority information indicates that the execution of the command is permitted, the command execution unit 150 can execute the command. If the acquisition unit 140 has not acquired the command identification information, the command execution unit 150 may not execute the command. In addition, if the authority information indicates that the execution of the command is restricted, the command execution unit 150 can restrict the execution of the command.

The functions provided in the display control apparatus 100 and 200 according to the modified example of the embodiment of the present disclosure have been described above with reference to FIG. 10. Hereinafter, an operation of the display control system 1 according to the modified example of the embodiment of the present disclosure will be described in detail with reference to FIG. 11.

FIG. 11 is a flowchart illustrating a flow of the operation of the display control system 1 according to the modified example of the embodiment of the present disclosure.

If the display control unit 130 of the execution terminal 10 performs display control of a screen including items as illustrated in FIG. 11, the display apparatus 16 displays the screen including the items according to the display control by the display control unit 130 (step S31). The number of items is not particularly limited as described above. Subsequently, the transmission control unit 120 controls configuration information of the screen and authority information and command identification information for the command to be executed from the item to be transmitted to the operation terminal 20. According to the control by the transmission control unit 120, the communication apparatus 18 transmits the configuration information, the authority information, and the command identification information to the operation terminal 20 (step S32). The configuration information, the authority information, and the command identification information may be transmitted, for example, if the operation detection unit 110 has detected the transmission operation from the user.

Subsequently, if the communication apparatus 28 of the operation terminal 20 receives the configuration information, the authority information, and the command identification information from the execution terminal 10 (step S41), the information acquisition unit 230 acquires the configuration information, the authority information, and the command identification information received by the communication apparatus 28. On the other hand, if the imaging apparatus 21 images a screen subjected to display control by the display control unit 130, the image acquisition unit 210 acquires a captured image obtained according to imaging by the imaging apparatus 21 (step S42). The recognition unit 220 recognizes the screen from the captured image (step S43). Subsequently, if the display control unit 240 performs display control of the captured image, the display apparatus 26 displays the captured image (step S44).

Subsequently, if the authority information indicates that the execution of the command is restricted ("Yes" in step S45), the display control unit 240 adds a restriction display to the captured image based on the configuration information and the recognition result (step S46), and proceeds to step S47. If the authority information does not indicate that the execution of the command is restricted (that is, if the execution of the command is indicated as being permitted) ("No" in step S45), the display control unit 240 proceeds to step S47. Subsequently, if the operation detection unit 250 detects designated coordinates from the user, the transmission control unit 260 converts the designated coordinates based on the recognition result obtained according to recognition by the recognition unit 220 (step S47).

If coordinates after the conversion are not item coordinates (or are not close to the item coordinates) ("No" in step S48), the transmission control unit 260 ends the operation without executing the command. Alternatively, the display control unit 130 may re-perform the display control (step S31). On the other hand, the transmission control unit 260 controls the command identification information corresponding to the item to be transmitted if the coordinates after the conversion are the item coordinates (or are close to the item coordinates) ("Yes" in step S48). The communication apparatus 28 transmits the command identification information according to the control by the transmission control unit 260 (step S49). If the communication apparatus 18 of the execution terminal 10 receives the command identification information (step S33), the acquisition unit 140 acquires the command identification information received by the communication apparatus 18.

Subsequently, if the authority information does not indicate that the execution of the command is permitted (that is, if the execution of the command is indicated as being restricted) ("No" in step S34), the command execution unit 150 ends the operation without executing the command identified by the command identification information. Alternatively, the display control unit 130 may re-perform display control (step S31). If the authority information indicates that the execution of the command is permitted ("Yes" in step S35), the command execution unit 150 executes the command identified by the command identification information (step S36), and ends the operation. Alternatively, the display control unit 130 may re-perform the display control (step S31). The display control unit 130 may perform display control of the command execution result.

The flow of the operation of the display control system 1 according to the modified example of the embodiment of the present disclosure has been described above with reference to FIG. 11.

<7. Conclusion>

As described above, the display control apparatus 200 according to the present disclosure has the information acquisition unit 230 that acquires configuration information of a screen including one or more items of the display control apparatus 100 and authority information for a command to be executed from the item. In addition, if the authority information indicates that the execution of the command is restricted, the display control apparatus 200 includes the display control unit 240 that controls a restriction display, which is a display indicating that the execution of the command is restricted, to be performed based on the screen recognition result and the configuration information. Thus, if the control of the command execution by the execution terminal 10 is performed using the recognition result of the screen subjected to display control by the execution terminal 10, the operation terminal 20 to be operated by the user enables the user to easily recognize the command whose execution is restricted.

Although the preferred embodiments of the present disclosure have been described with reference to the accompanying drawings, a technical range of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, although an example in which the display control apparatus 200 has the screen recognition function has been described above, the server may have the above-described function instead of the display control apparatus 200. For example, if the display control apparatus 200 has transmitted a captured image to the server, the server may recognize a screen from the captured image in place of the display control apparatus 200. As described above, the technology of the present disclosure can also be applied to cloud computing.

In addition, the steps in the operation of the display control system 1 of this specification are not necessarily performed in time series in the order described as the flowchart. For example, the steps in the operation of the display control system 1 may be processed in an order different from the order described in the flowchart or processed in parallel.

In addition, it is possible to create a computer program for causing hardware such as a CPU, a read only memory (ROM), and a random access memory (RAM) embedded in the execution terminal 10 or the operation terminal 20 to have the same functions as each configuration of the above-described execution terminal 10 or operation terminal 20. In addition, a storage medium recording the computer program is also provided.

Additionally, the present technology may also be configured as below.

(1) An information processing system, comprising: one or more processing units that acquire captured image data corresponding to a user interface displayed on a first display, the user interface including a plurality of graphic representations each corresponding to a respective function; and control a second display to display a representation of the user interface based on a recognition process performed on the user interface, the representation of the user interface indicating whether a function corresponding the plurality of the graphic representations is capable of being accessed.

(2) The information processing system of (1), further comprising: an image capturing unit that captures the image data corresponding to the user interface displayed on the first display.

(3) The information processing system of any of (1) to (2), wherein the one or more processing units acquire at least one of configuration information and authority information corresponding to the user interface displayed on the first display.

(4) The information processing system of any of (1) to (3), wherein the configuration information indicates a position at which each of the plurality of graphic representations are displayed on the first display.

(5) The information processing system of any of (1) to (4), wherein the authority information indicates whether a function corresponding to each of the plurality of the graphic representations is capable of being accessed.

(6) The information processing system of any of (1) to (5), wherein the one or more processing units generate the representation of the user interface based on the acquired configuration information.

(7) The information processing system of any of (1) to (6), wherein the one or more processing units control the second display to display the representation of the user interface such that a predetermined visual effect is applied to at least one of the plurality of graphic representations corresponding to a function that is not capable of being accessed.

(8) The information processing system of any of (1) to (7), wherein the one or more processing units control the second display to display the representation of the user interface such that at least one of the plurality of graphic representations corresponding to a function that is not capable of being accessed is omitted.

(9) The information processing system of any of (1) to (8), wherein the one or more processing units control the second display to display the representation of the user interface such that an image is superimposed on at least one of the plurality of graphic representations corresponding to a function that is not capable of being accessed is omitted.

(10) The information processing system of any of (1) to (9), further comprising: a user interface that receives a selection of one of the plurality of graphic representations displayed in the representation of user interface displayed on the second display.

(11) The information processing system of any of (1) to (10), further comprising: a communication interface, wherein the one or more processing units control the communication interface to transmit information corresponding to the selection of the one of the plurality of graphic representations displayed in the representation of user interface displayed on the second display to an information processing apparatus including the first display.

(12) The information processing system of any of (1) to (11), further comprising: a communication interface, wherein the one or more processing units control the communication interface to transmit coordinate information corresponding to the selection of the one of the plurality of graphic representations displayed in the representation of user interface displayed on the second display to an information processing apparatus including the first display.

(13) The information processing system of any of (1) to (12), further comprising: a communication interface, wherein the one or more processing units control the communication interface to transmit command identification information corresponding to the selection of the one of the plurality of graphic representations displayed in the representation of user interface displayed on the second display to an information processing apparatus including the first display.

(14) The information processing system of any of (1) to (13), wherein one of the plurality of graphic representations corresponds to an photo browsing application.

(15) The information processing system of any of (1) to (14), further comprising: a user interface that receives a selection of the graphic representation corresponding to the photo browsing application displayed in the representation of user interface displayed on the second display; and a communication interface, wherein the one or more processing units control the communication interface to transmit information corresponding to the selection of the graphic representation corresponding to the photo browsing application to an information processing apparatus including the first display, wherein the information processing apparatus executes the photo browsing application in response to receiving the information corresponding to the selection of the graphic representation.

(16) The information processing system of any of (1) to (15), wherein the information processing system is a first information processing apparatus and the plurality of graphic representations each corresponding to a respective function implemented at a second information processing apparatus.

(17) The information processing system of any of (1) to (18), wherein the captured image data corresponding to a user interface displayed on a first display is still image data.

(18) The information processing system of any of (1) to (17), further comprising: a user interface that receives authentication information corresponding to a function that is not capable of being accessed.

(19) The information processing system of any of (1) to (18), wherein the one or more processing units controls the display to change the representation of the user interface to indicate that a function is capable of being accessed based on the received authentication information.

(20) The information processing apparatus of any of (1) to (19), wherein the user interface displays a screen to input the authentication information when an graphic representation corresponding to a function that is not capable of being accessed is selected at the second display.

(21) The information processing apparatus of any of (1) to (20), wherein the plurality of graphic representations include at least an icon corresponding to a function.

(22) An information processing method performed by an information processing system, the method comprising: acquiring captured image data corresponding to a user interface displayed on a first display, the user interface including a plurality of graphic representations each corresponding to a respective function; and controlling a second display to display a representation of the user interface based on a recognition process performed on the user interface, the representation of the user interface indicating whether a function corresponding the plurality of the graphic representations is capable of being accessed.

(23) A non-transitory computer-readable medium including computer program instructions, which when executed by an information processing system, cause the information processing system to perform a process, the process comprising: acquiring captured image data corresponding to a user interface displayed on a first display, the user interface including a plurality of graphic representations each corresponding to a respective function; and controlling a second display to display a representation of the user interface based on a recognition process performed on the user interface, the representation of the user interface indicating whether a function corresponding the plurality of the graphic representations is capable of being accessed.

REFERENCE SIGNS LIST

1 Display control system
10 Execution terminal
20 Operation terminal
100 Display control apparatus
110 Operation detection unit
120 Transmission control unit
130 Display control unit
140 Acquisition unit
150 Command execution unit
200 Display control apparatus
210 Image acquisition unit
220 Recognition unit
230 Information acquisition unit
240 Display control unit
250 Operation detection unit
260 Transmission control unit

The invention claimed is:

1. An information processing system, comprising:
a first information processing apparatus including a first display and first circuitry, the first circuitry configured to:
acquire captured image data corresponding to a user interface displayed on a second display of a second information processing apparatus, the user interface including a plurality of graphic representations each corresponding to respective functions;

receive configuration information and authority information corresponding to the user interface from the second information processing apparatus, the authority information indicating whether the second information processing apparatus permits or restricts an execution of a command transmitted from the first circuitry to the second information processing apparatus;

recognize a screen and items included in the captured image data;

control the first display to display, when the authority information indicates that execution of the command is permitted, a first representation of the user interface based on the captured image data, the first representation of the user interface indicating that functions corresponding to the plurality of the graphic representations are capable of being accessed;

control the first display to display, when the authority information indicates that execution of the command is not permitted, a second representation of the user interface based on the captured image data, the second representation of the user interface including a restriction display image superimposed on at least one of the plurality of graphic representations corresponding to a function that is not capable of being accessed;

convert coordinates of the items according to the configuration information, the authority information, and the screen and the items included in the captured image;

transmit the converted coordinates and the command to the second information processing apparatus; and the second information processing apparatus including second circuitry configured to:

transmit the configuration information and the authority information to the first information processing apparatus;

receive the converted coordinates and the command from the first information processing apparatus;

determine whether the converted coordinates correspond to items within the user interface;

determine, when the converted coordinates correspond to the items within the user interface, whether the command is authorized according to the authority information; and execute the command when the command is authorized according to the authority information.

2. The information processing system of claim 1, wherein the first circuitry is further configured to capture the image data corresponding to the user interface displayed on the second display.

3. The information processing system of claim 1, wherein the configuration information indicates a position at which each of the plurality of graphic representations are displayed on the second display.

4. The information processing system of claim 1, wherein the first circuitry is further configured to generate the first representation of the user interface or the second representation of the user interface based on the acquired configuration information.

5. The information processing system of claim 1, wherein the first circuitry is further configured to control the first display to display the second representation of the user interface such that a predetermined visual effect is applied to at least one of the plurality of graphic representations corresponding to a function that is not capable of being accessed.

6. The information processing system of claim 1, wherein the first circuitry is further configured to control the first display to display the second representation of the user interface such that at least one of the plurality of graphic representations corresponding to a function that is not capable of being accessed is omitted.

7. The information processing system of claim 1, wherein the first information processing apparatus further comprises a user interface that receives a selection of one of the plurality of graphic representations.

8. The information processing system of claim 7, wherein
the first information processing apparatus further comprises a communication interface, and
the first circuitry is further configured to control the communication interface to transmit information corresponding to the selection of the one of the plurality of graphic representations to the second information processing apparatus.

9. The information processing system of claim 7, wherein
the first information processing apparatus further comprises a communication interface, and
the first circuitry is further configured to control the communication interface to transmit command identification information corresponding to the selection of the one of the plurality of graphic representations to the second information processing apparatus.

10. The information processing system of claim 7, wherein one of the plurality of graphic representations corresponds to an photo browsing application.

11. The information processing system of claim 10, wherein
the first information processing apparatus further comprises:
a user interface that receives a selection of the graphic representation corresponding to the photo browsing application displayed on the display; and
a communication interface,
the first circuitry is further configured to control the communication interface to transmit information corresponding to the selection of the graphic representation corresponding to the photo browsing application to the second information processing apparatus, and
the second information processing apparatus executes the photo browsing application in response to receiving the information.

12. The information processing system of claim 1, wherein the captured image data is still image data.

13. The information processing system of claim 1, wherein the first information processing apparatus further comprises a user interface that receives authentication information corresponding to a function that is not capable of being accessed.

14. The information processing system of claim 13, wherein the first circuitry is further configured to control the first display to change the representation of the user interface to indicate that a function is capable of being accessed based on the received authentication information.

15. The information processing apparatus of claim 13, wherein the user interface displays a screen to input the authentication information when a graphic representation corresponding to a function that is not capable of being accessed is selected at the first display.

16. An information processing method performed by an information processing system including a first information processing apparatus and a second information processing apparatus, the method comprising:

acquiring, by first circuitry of the first information processing apparatus, captured image data corresponding to a user interface displayed on a second display of the second information processing apparatus, the user interface including a plurality of graphic representations each corresponding to respective functions;

receiving, by the first circuitry, configuration information and authority information corresponding to the user interface displayed on the display from the second information processing apparatus, the authority information indicating whether the second information processing apparatus permits or restricts an execution of a command transmitted from the first circuitry to the second information processing apparatus;

recognizing, by the first circuitry, a screen and items included in the captured image data;

displaying, by a first display of the fist information processing apparatus when the authority information indicates that execution of the command is permitted, a first representation of the user interface based on the captured image data, the first representation of the user interface indicating that functions corresponding to the plurality of the graphic representations are capable of being accessed;

displaying, by the first display when the authority information indicates that execution of the command is not permitted, a second representation of the user interface based on the captured image data, the second representation of the user interface including a restriction display image superimposed on at least one of the plurality of graphic representations corresponding to a function that is not capable of being accessed;

converting, by the first circuitry, coordinates of the items according to the configuration information, the authority information, and the screen and the items included in the captured image;

transmitting, by the first circuitry, the converted coordinates and the command to the second information processing apparatus;

transmitting, by second circuitry of the second information processing apparatus, the configuration information and the authority information to the first information processing apparatus;

receiving, by the second circuitry, the converted coordinates and the command from the first information processing apparatus;

determining, by the second circuitry, whether the converted coordinates correspond to items within the user interface;

determining, by the second circuitry when the converted coordinates correspond to the items within the user interface, whether the command is authorized according to the authority information; and executing, by the second circuitry when the command is authorized, the command according to the authority information.

17. An information processing system, comprising:

a first information processing apparatus including a first display and first circuitry, the first circuitry configured to:

acquire captured image data corresponding to a user interface displayed on a second display of a second information processing apparatus, the user interface including a plurality of graphic representations each corresponding to respective functions;

receive configuration information and authority information corresponding to the user interface from the second information processing apparatus, the authority information indicating whether the second information processing apparatus permits or restricts an execution of a command transmitted from the first circuitry to the second information processing apparatus;

recognize a screen and items included in the captured image data;

control the first display to display, when the authority information indicates that execution of the command is permitted, a first representation of the user interface based on the captured image data, the first representation of the user interface indicating that functions corresponding to the plurality of the graphic representations are capable of being accessed;

control the first display to display, when the authority information indicates that execution of the command is not permitted, a second representation of the user interface based on the captured image data, the second representation of the user interface including a restriction display image superimposed on at least one of the plurality of graphic representations corresponding to a function that is not capable of being accessed;

convert coordinates of the items according to the configuration information, the authority information, and the screen and the items included in the captured image; and transmit the converted coordinates and the command to the second information processing apparatus, wherein the second information processing apparatus is configured to receive the converted coordinates and the command from the first information processing apparatus;

determine whether the converted coordinates correspond to items within the user interface;

determine, when the converted coordinates correspond to the items within the user interface, whether the command is authorized according to the authority information; and execute the command when the command is authorized according to the authority information.

* * * * *